United States Patent [19]

Leach

[11] Patent Number: 5,077,643

[45] Date of Patent: Dec. 31, 1991

[54] COMBINATION COURTESY LIGHT AND DETACHABLE FLASHLIGHT ASSEMBLY

[76] Inventor: Philip J. Leach, 1139 Webster Dr., Wilmington, Del. 19803

[21] Appl. No.: 564,787

[22] Filed: Aug. 9, 1990

[51] Int. Cl.⁵ .............................................. B60Q 3/02
[52] U.S. Cl. ...................................... 362/183; 362/74; 362/155; 362/191
[58] Field of Search .................. 362/74, 155, 82, 190, 362/191, 183, 80; 320/2

[56] References Cited

U.S. PATENT DOCUMENTS

| | | | |
|---|---|---|---|
| 3,096,941 | 7/1963 | Miller | 240/6.4 |
| 3,825,740 | 7/1974 | Friedman et al. | 240/10.6 |
| 4,080,557 | 3/1978 | Hennion | 320/2 |
| 4,168,411 | 9/1979 | Peck | 362/155 |
| 4,234,839 | 11/1980 | King et al. | 320/2 |
| 4,282,562 | 8/1981 | Marino | 362/183 |
| 4,388,673 | 6/1983 | Maglica | 362/183 |
| 4,398,139 | 8/1983 | Prinsze | 362/183 |
| 4,819,134 | 4/1989 | Rossi | 362/61 |
| 4,819,139 | 4/1989 | Thomas | 362/191 |
| 4,847,738 | 7/1989 | Nehl | 362/155 |

Primary Examiner—Ira S. Lazarus
Assistant Examiner—Y. Quach
Attorney, Agent, or Firm—Leonard Bloom

[57] ABSTRACT

A combination courtesy light and detachable flashlight assembly is provided to permit the operator of a vehicle to detach the flashlight from a flush-mounted receptacle. The flashlight operates from rechargeable batteries charged by a power supply when the flashlight is inserted in the receptacle.

18 Claims, 9 Drawing Sheets

FIG.18

COMBINATION COURTESY LIGHT AND DETACHABLE FLASHLIGHT ASSEMBLY

FIELD OF THE INVENTION

The invention relates to a vehicle light unit and, more particularly, to a vehicle courtesy light which can be detached and used as a flashlight.

BACKGROUND OF THE INVENTION

Conventional vehicles provide a number of courtesy lights for the convenience of the operator. For instance, automobiles are equipped with a passenger compartment light, left and right side door lights, dashboard lights and an engine compartment light, etc. These lights are marginally effective in many situations because of their fixed position. For this reason many operators carry a flashlight for working on the engine, changing tires or searching in obscure places such as under the seat. However, flashlights are inconvenient because they take up additional space in the glove compartment. Moreover, flashlight batteries are often found to be dead in those situations when the operator needs the flashlight most. Attempts have been made to overcome the problem of dead batteries by using electrical cords that can be plugged into the cigarette lighter. Such flashlights may operate directly from the car's electrical system, or they may be equipped with a rechargeable battery which recharges from the car's electrical system. In either case, the cord restricts the flashlights freedom of movement, and the flashlight continues to occupy glove compartment space.

Another more successful attempt in solving the above problems is found in U.S. Pat. No. 4,819,134. Here is shown a rechargeable flashlight and mounting assembly which allows the flashlight to be mounted in the passenger compartment of an automobile for use as an interior light. A mounting plate is provided which connects to the vehicle electrical system so that the battery can be recharged while the vehicle is in operation. Unfortunately, the discussed concept is not efficiently implemented. The device is designed to be retrofitted and does not conveniently mount within the interior panels of the vehicle. When the light is mounted in the passenger compartment an inconvenient and possibly dangerous protrusion exists. Moreover, the configuration of the battery contacts provides an unstable electrical connection to the mounting bracket, and the contacts themselves are susceptible to breaking off. In addition, the illustrated light bulb and charging circuit are designed to operate from a 12 V battery which, if intended to drive the light bulb for any length of time, must be much larger than standard 1.5 V batteries.

SUMMARY OF THE INVENTION

It is therefore a primary object of the invention to provide a combination automobile courtesy light and a detachable flashlight assembly which is small in size, and is aesthetically pleasing.

It is another object to provide a structurally sound mounting assembly which firmly locks the flashlight in place and has sturdy electrical contacts which create a secure electrical connection.

It is a further object of the present invention to provide various mountings so that the light may be used in numerous places within the vehicle.

According to the present invention these and other objects are accomplished by providing a combination courtesy light and flashlight assembly having a power supply, a compartment within a wall of a vehicle, number electrical contacts disposed within said compartment and connected to the power supply, and a light unit with a corresponding number of electrical contacts disposed exteriorly for providing a conductive coupling when the light unit is inserted in the compartment. The light unit includes a housing, a rechargeable battery connected to the contacts for storing a charge, a switch mounted on the housing, and a light source controlled by the switch. The stored charge energizes the light source when the switch is closed and the light unit is not inserted in the compartment, and the power supply energizes the light source when the switch is closed and the light unit is inserted in the compartment.

BRIEF DESCRIPTION OF THE DRAWINGS

Other objects, features and advantages of the present invention will become more apparent from the following detailed description of preferred embodiments and certain modifications thereof when taken together with the accompanying drawings, in which.

DETAILED DESCRIPTION OF THE PREFERRED EMBODIMENTS

Figure 1:
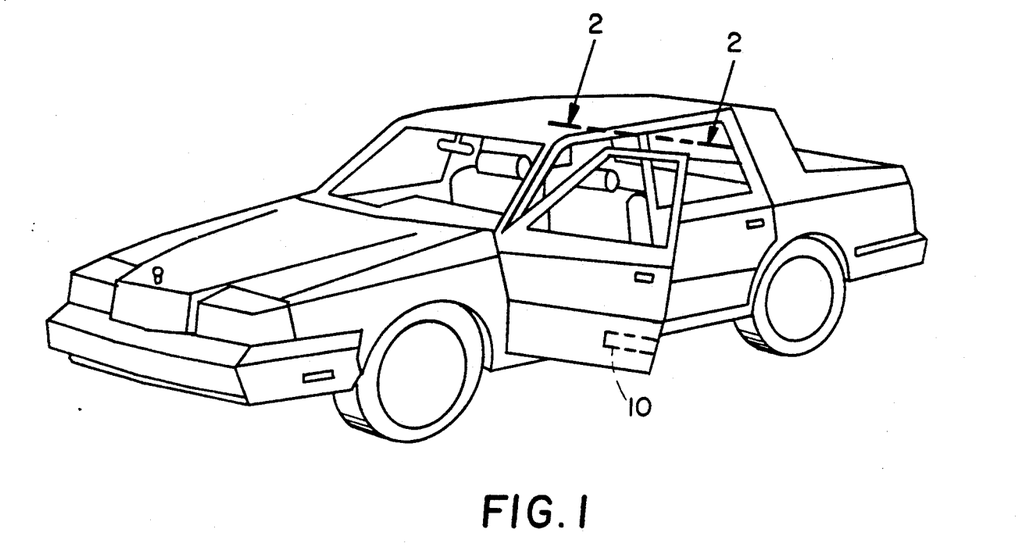
FIG. 1 is a perspective view of one embodiment according to the present invention.
Figure 2:
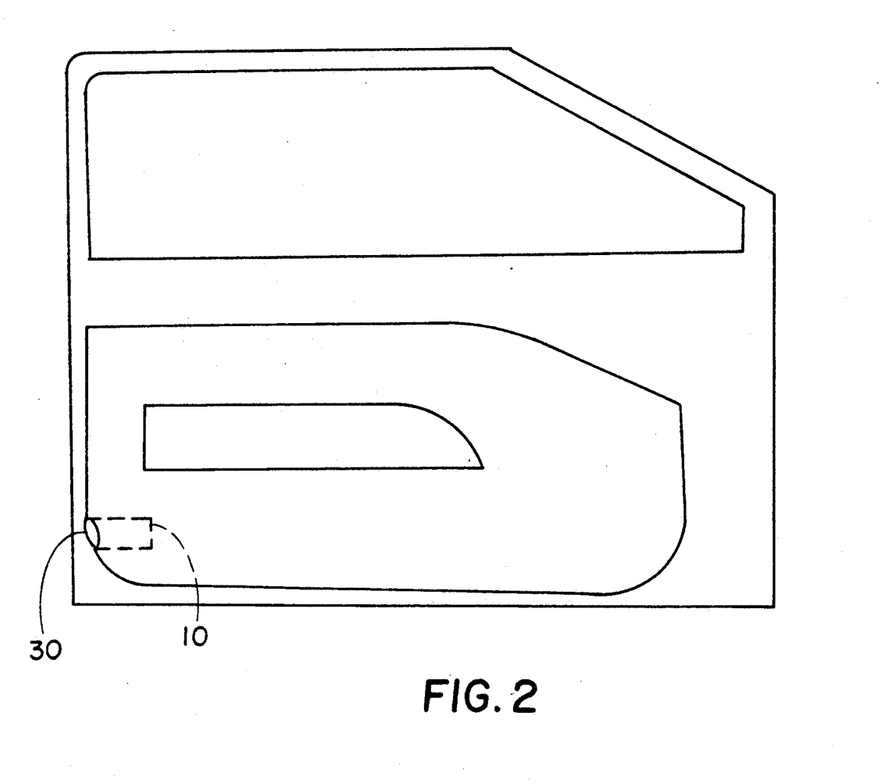
FIG. 2 is a perspective view of the embodiment shown in FIG. 1.
Figure 3:
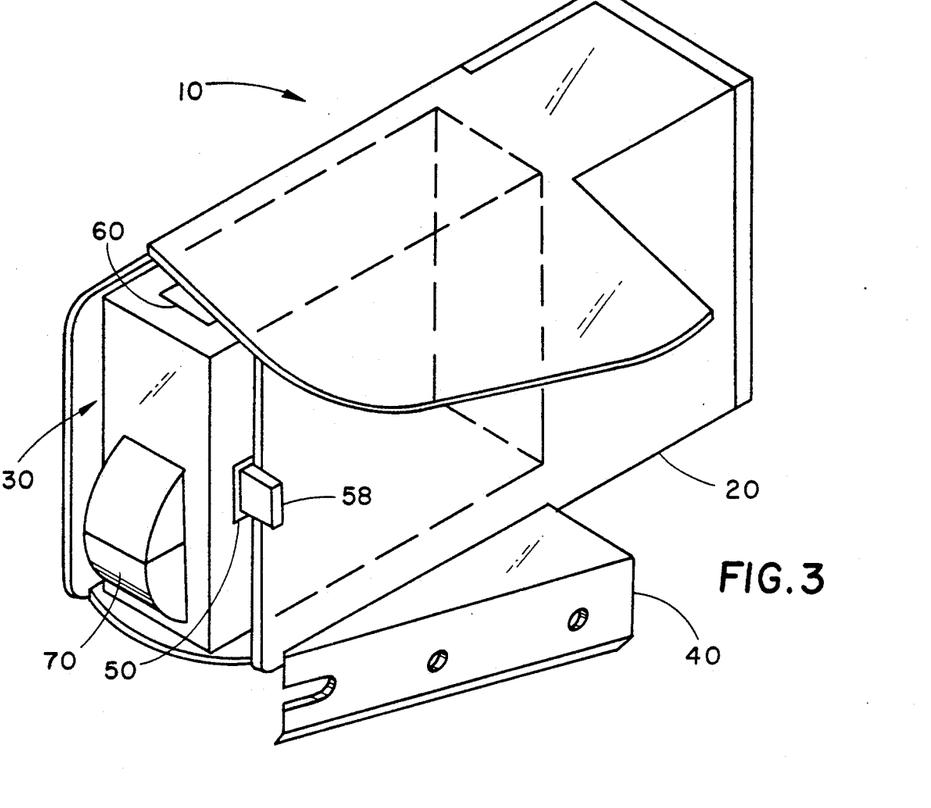
FIG. 3 depicts the combination courtesy light and detachable flashlight assembly of FIG. 1.

In reference to FIGS. 1-3,

FIG. 1 shows a perspective view of an automobile having a combination courtesy light and a detachable flashlight assembly mounted in the front passenger side door.

FIG. 2 is cross-sectional view taken along the line 5 shown in FIG. 1. The position of the courtesy light/flashlight assembly 10 in the door is shown more clearly.

FIG. 3 illustrates a detailed view of the assembly 10 shown in FIGS. 1 and 2. The assembly 10 includes a receptacle 20 which forms a compartment extending within the door panel of the vehicle, and light unit 30. The receptacle 20 is designed to fit the contour of the door panel as seen in FIGS. 1 and 2, and can be bolted securely to the inside of the door panel by means of a mounting bracket 40. The light unit 30 is shown inserted within receptacle 20, and a detent latch 50 secures the light unit in position. A recessed switch 60 is provided for turning the light unit 30 on or off. Switch 60 is recessed so that it does not interfere with the insertion of light unit 30 in receptacle 20. When the light unit is turned on by means of switch 60 light emanates from a light source (not shown) and is directed by lens 70. Lens 70 may be a single color lens or, as shown, may be a dual colored lens for directing two colored beams of light in different directions. This is useful with the door mounted embodiment of FIG. 1 because a red beam of light can be directed backward from the vehicle to warn oncoming traffic of the open door, and a white beam of light can be directed downward to illuminate the ground to assist the operator in exiting the vehicle.

Figure 4:
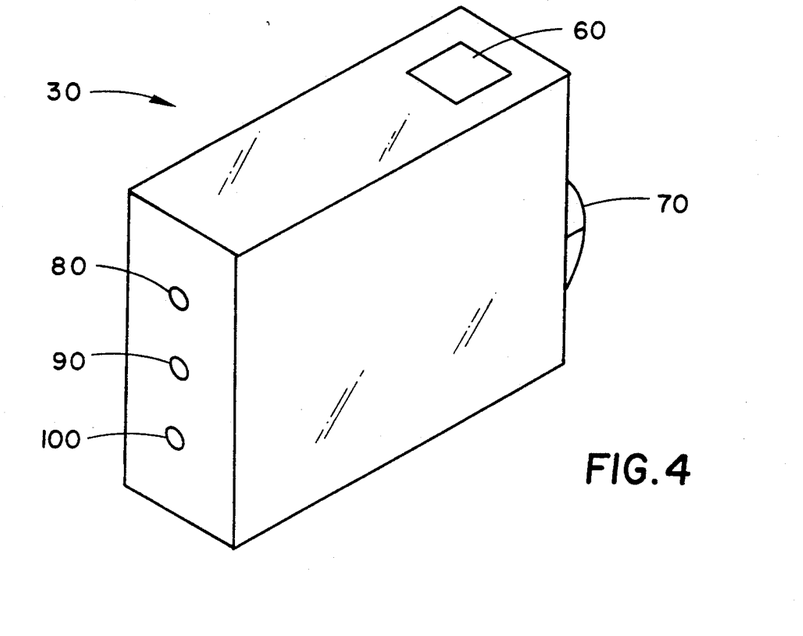
FIG. 4 illustrates a backview of the light unit shown in FIG. 3.

FIG. 4 depicts the light unit 30 removed from receptacle 20. Three metal contacts 80-100 are visible at the rear of the light unit 30.

Figure 5:
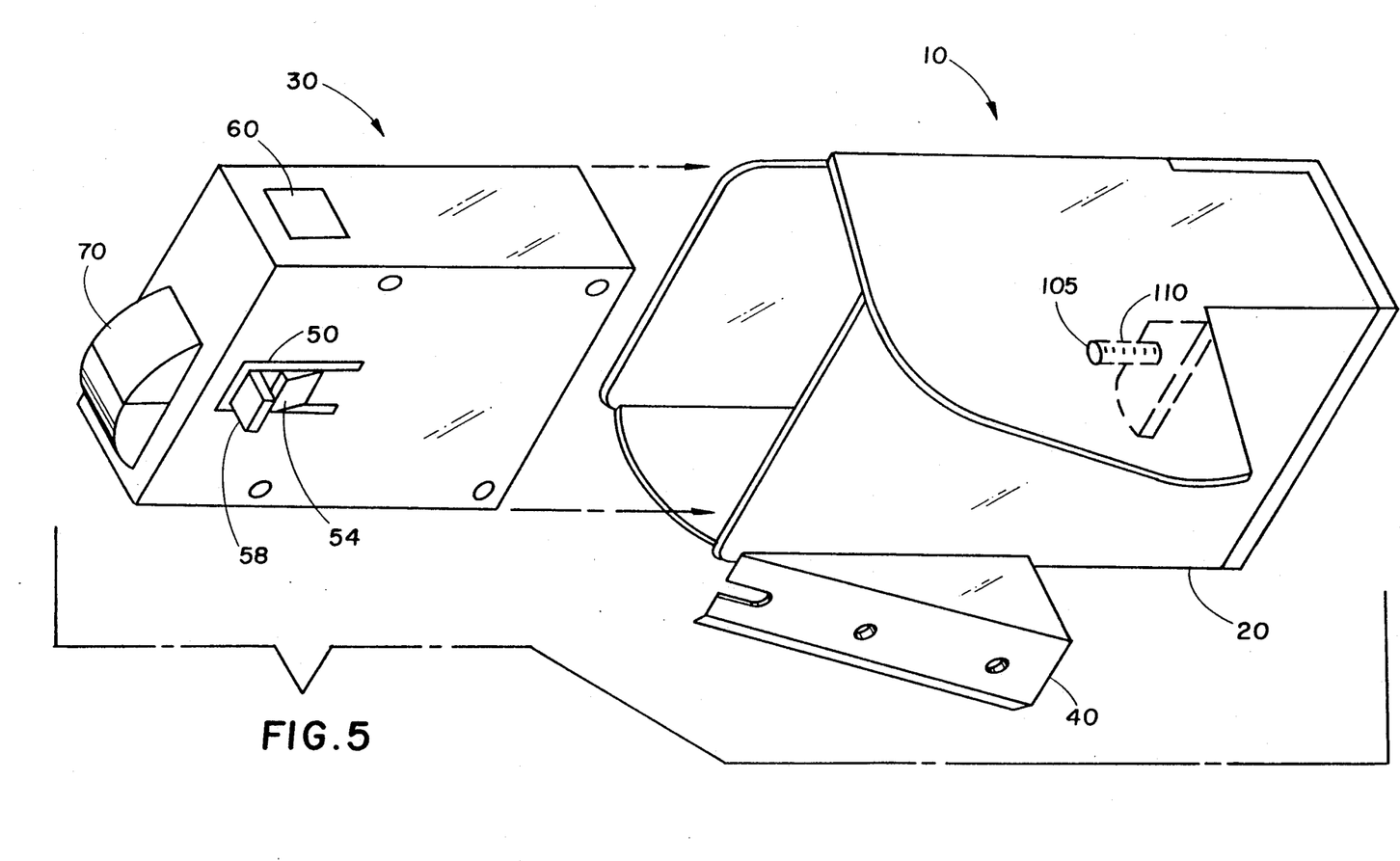
FIG. 5 is a perspective view of the light unit shown in FIG. 3 as it is inserted into the receptacle shown in FIG. 3.

FIG. 5 depicts light unit 30 and the manner of insertion within receptacle 20. The contacts 80-100 of FIG. 4 are designed to form an electrical coupling with a corresponding spring mounted contact 105 protruding from the rear of receptacle 20. Each spring mounted contact 105 creates an opposing force on the light unit 30 when it is inserted within receptacle 20. The opposing force ensures that the electrical coupling between corresponding contacts is stable and properly conductive. In order to retain the light unit 30 within receptacle 20 against the opposing force created by contacts 105, a detent latch 50 is provided for locking the light unit 30 against the rim of receptacle 20. The detent latch is a flexible finger carved into the housing of light unit 30. A ramped retaining member 54 is provided which gradually depresses the flexible finger as the light unit 30 is slid into receptacle 20. When the light unit 30 is fully inserted, retaining member 54 moves past the rim of receptacle 20 and the flexible finger springs outward such that the base of ramp 54 locks against the rim of receptacle 20. A tab 58 is provided to allow manual depression of the flexible finger so light unit 30 can be removed from receptacle 20.

Figures 6, 7:
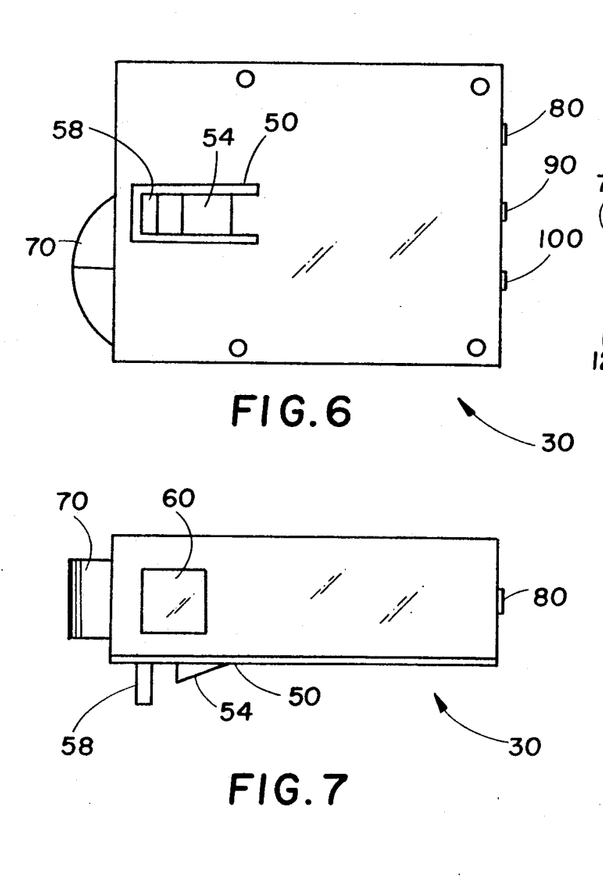
FIG. 6 is a top view of the light unit of FIG. 3.
FIG. 7 is a side view of the light unit of FIG. 3.

FIGS. 6 and 7 show a top view and a side view, respectively, by which the proportions of the detent latch 50 are clearly visible.

Figures 8, 9:
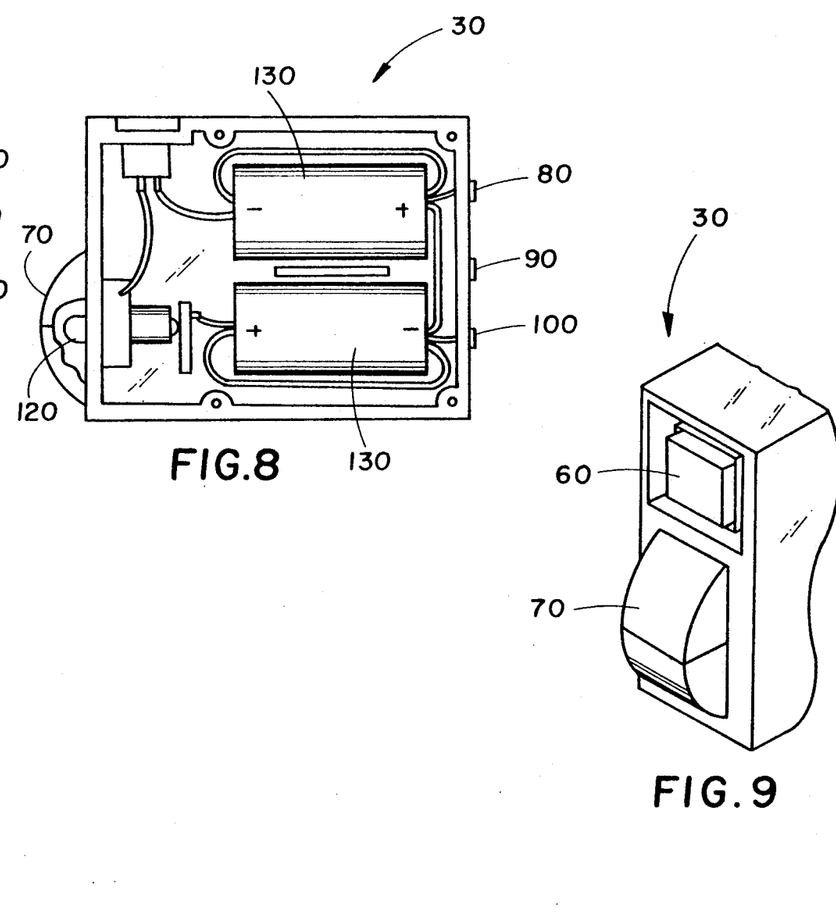
FIG. 8 is a cutaway view showing the internal circuitry of the light unit of FIGS. 6 and 7.
FIG. 9 is a front view of the light unit of FIGS. 6 and 7.

FIG. 8 depicts the internal components and wiring of the light unit 30 according to one embodiment of the present invention. A pair of rechargeable power cells are connected in series to form a battery 130. The positive and negative terminals of the battery 130 are connected to contacts 80 and 90, respectively. The negative terminal of the batteries are also connected through switch 60 to one terminal of a light source 120. The positive terminals of the batteries are connected to the other terminal of light source 120. If the battery 130 is charged by an electrical current applied at contacts 80 and 90, then when switch 60 is closed the light source 120 will be powered from the stored charge. Additional benefits can be realized by including batteries 130 within a separate section of light unit 30 which can be detached in order to provide a portable battery unit to power other electrical devices.

FIG. 9 depicts an alternate embodiment in which switch 60 is mounted on the front of light unit 30 for convenience.

Figure 10:
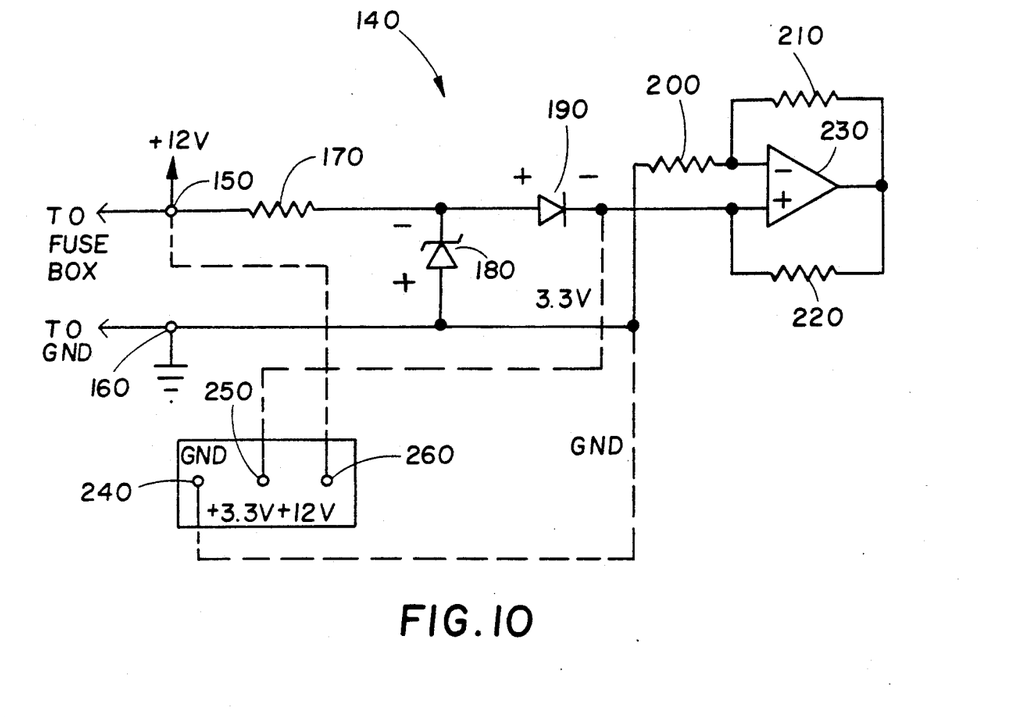
FIG. 10 is a schematic diagram of the power supply according to one embodiment of the present invention.

FIG. 10 depicts a power supply designed to provide 3.3 V regulated DC power to spring mounted contacts 100 for powering the light unit 30 or recharging battery 130 when light unit 30 is inserted within receptacle 20. The power supply 140 may be located in a separate compartment within receptacle 20. Power supply 140 includes a 12 V DC input terminal 150 and a ground input terminal 160. Both inputs 150 and 160 can be wired directly to the vehicle electrical system for regulating 12 V DC. power. A resistor 170 is connected to input terminal 150, and a zener diode 180 is connected from resistor 170 to ground terminal 160. Zener diode 180 is also connected through diode 190 to a current amplifier comprising operational amplifier 230 and resistors 200, 210 and 220. In operation, 12 V DC power from the vehicle electrical system is clamped at a predetermined level by diode 180. Resistors 200 through 220 and operational amplifier 230 amplify the current to provide a regulated 3.3 V DC 35 MA output. Three output terminals 240 through 260 are provided. Output terminal 240 is connected directly to the ground input 160. Output terminal 260 is connected directly to the 12 V DC unregulated input terminal 150. Output terminal 250 provides the 3.3 V regulated DC output signal.

Figure 11:
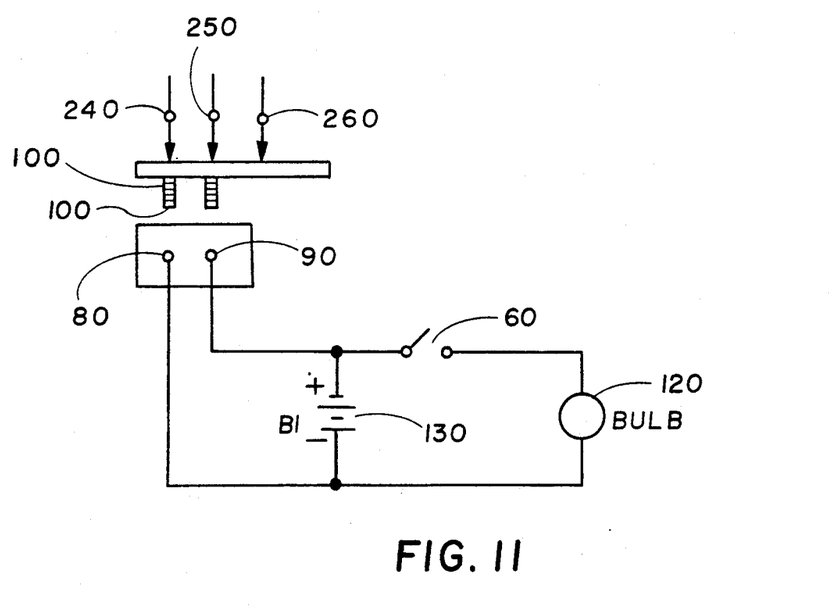
FIG. 11 is a schematic diagram of the internal circuitry of the light unit according to the present invention.

FIG. 11 depicts the connections of power supply 140 to light unit 30. Power supply output terminals 240 and 250 are each connected to a spring 110 and spring mounted contact 105 for providing an electrical coupling to contacts 80 and 90 of light unit 30. Power supply output terminal 260 may be connected through an additional spring 110 and spring mounted contact 105 to a spare input terminal (not shown) on the light unit 30. The spare input terminal may be configured to provide a conductive path to ground so that when light unit 30 is removed from receptacle 20 the conductive path is broken. An indicator light may be provided on the vehicle dashboard for signalling the operator when the conductive path has been broken and the light unit 30 removed. Alternately, the spare input terminal may be configured as a second switch which, upon opening the vehicle door, operates to illuminate the lamp 120.

Figure 12A:
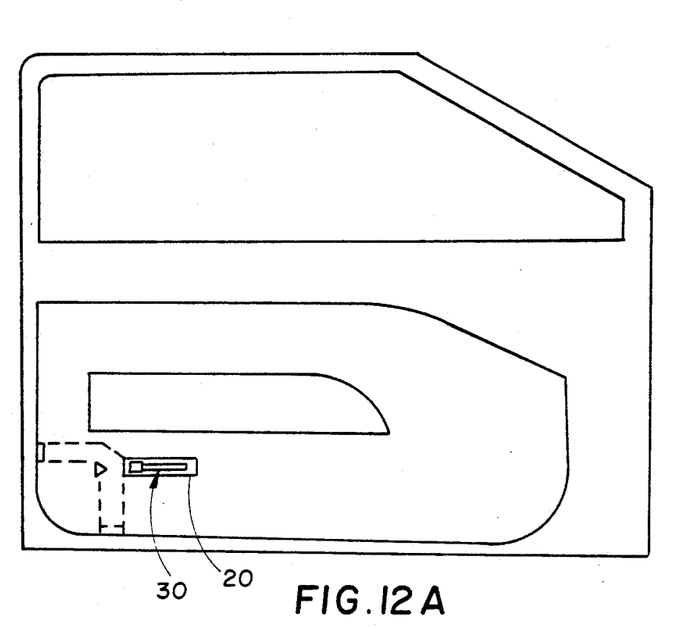
FIGS. 12A and 12B are cutaway views of another embodiment according to the present invention.
Figure 12B:
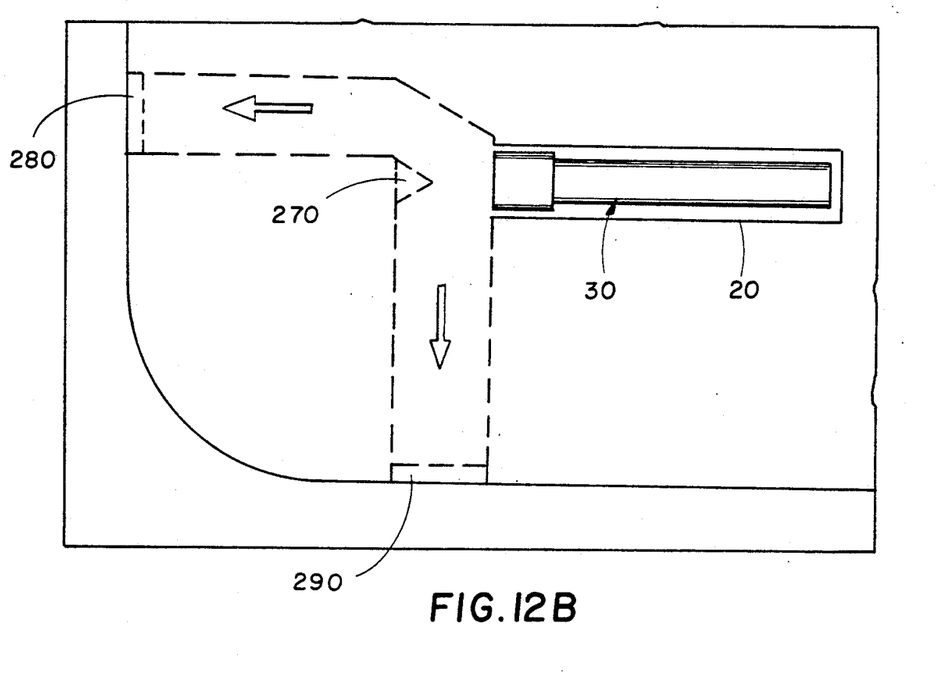

FIGS. 12A and 12B illustrate another embodiment of the present invention which incorporates a prism 270 to direct light in two directions. This allows more flexibility in mounting the light unit 30 within the door panel of the vehicle. Prism 270 can then be placed along the path of light emitted from light unit 30. The light beam is split and the resulting two light beams can be directed in the desired directions. In addition, colored lenses 280 and 290 may be provided along the light paths. This way, a red beam of light can be directed rearward of the door to warn oncoming vehicles of the open door, and a white beam of light can be directed towards the ground to assist the operator in exiting the vehicle.

Figure 13A:
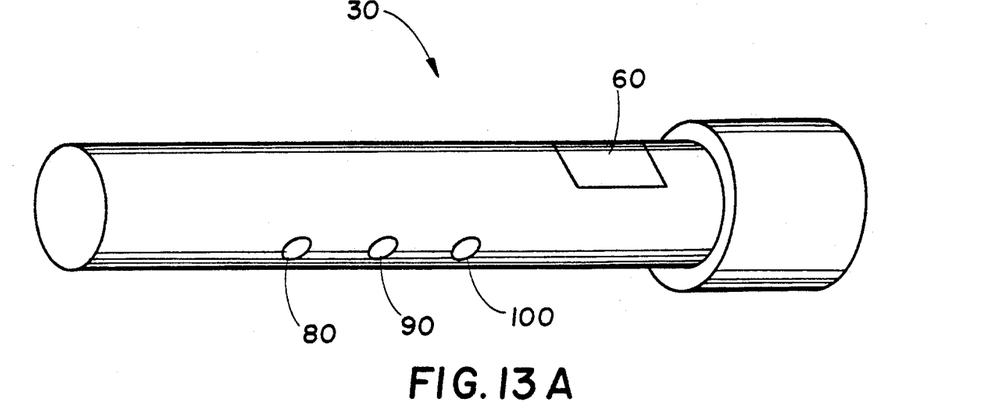
FIGS. 13A and 13B are close-up views of the light unit of FIG. 12.
Figure 13B:
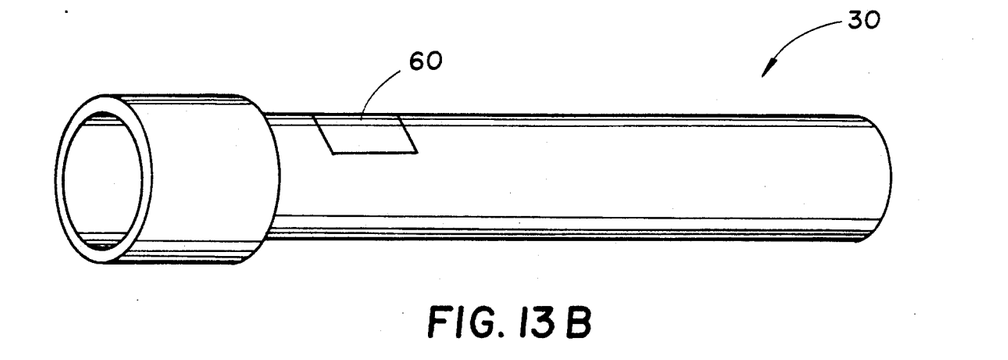

FIGS. 13A and 13B depict an alternate embodiment of the invention in which light unit 30 is shown in a different housing which may be more convenient for use as a hand held flashlight.

Figure 14:
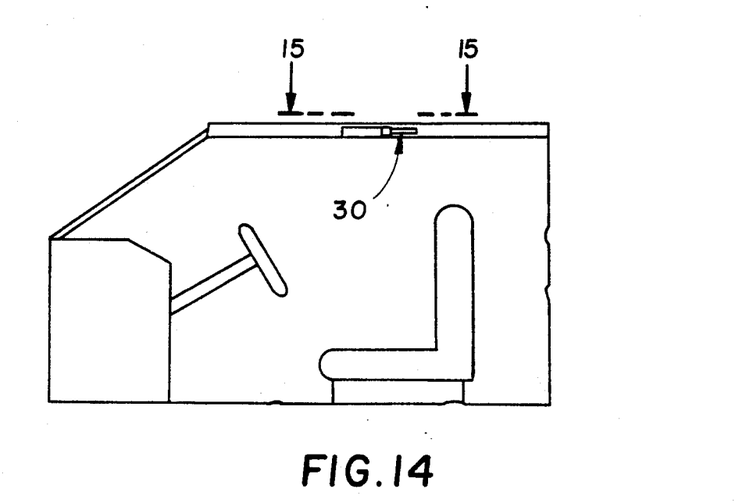
FIG. 14 is a perspective view of another embodiment according to the present invention which is mounted in the sealing of a passenger car.

FIGS. 14 depicts another embodiment of the present invention in which the combination courtesy light/flashlight assembly is housed in the roof of a vehicle.

Figure 15:
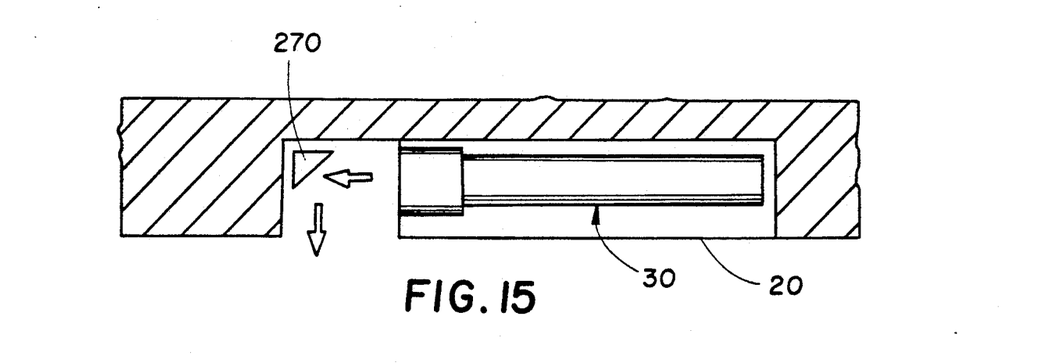
FIG. 15 is a close-up cutaway view of the embodiment of FIG. 14.

FIG. 15 depicts a cross-sectional view of the assembly of FIG. 14 and illustrates the mounting assembly in detail. Prism 270 is used to direct the light beam down into the passenger compartment of the vehicle.

Figure 16:
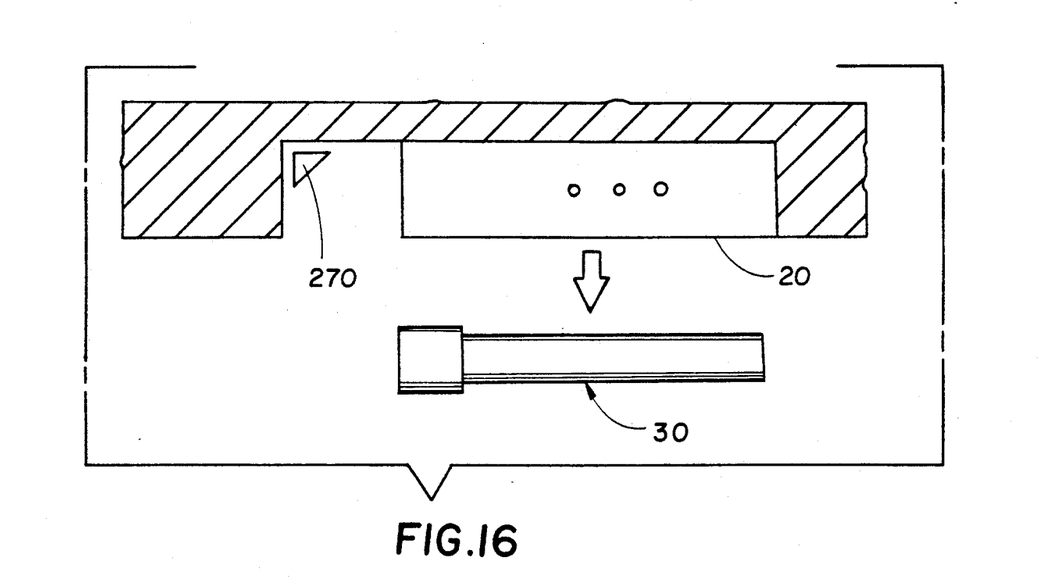
FIG. 16 illustrates the manner of detaching the light unit from the receptacle of the invention shown in FIG. 14.

FIG. 16 illustrates how light unit 30 is detached vertically from receptacle 20 to provide easy access for the vehicle operator.

Figure 17:
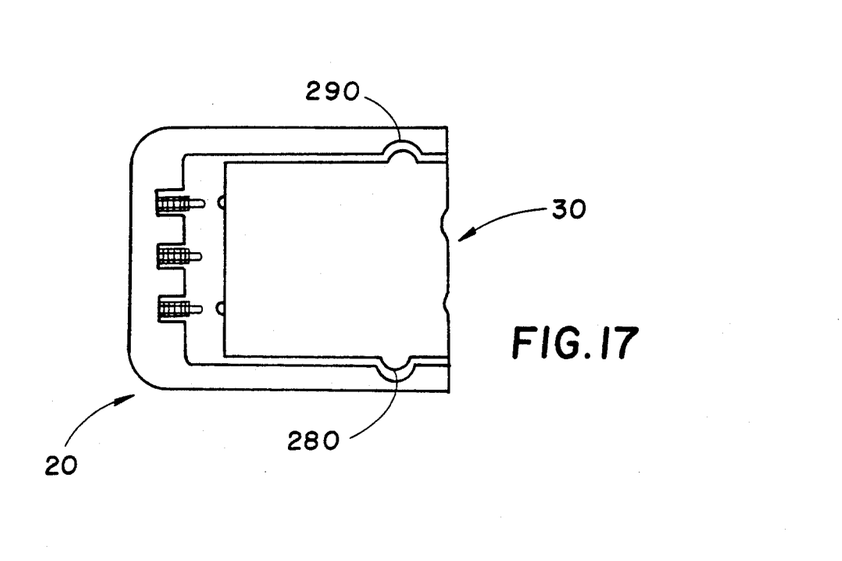
FIG. 17 depicts another embodiment of the present invention in which an interlocking hinge is substituted for the detent latch of FIGS. 6 and 7.

FIG. 17 illustrates another embodiment of the present invention in which interlocking rib 300 and groove 310 perform the function of the detent latch 50 of FIGS. 6 and 7. Rib 300 encircles the periphery of light unit 30, and groove 310 encircles the inner surface of receptacle 20. When the light unit 30 is inserted within the receptacle 20, the rib 300 interlocks with groove 310 to provide a compression fit.

Figure 18:
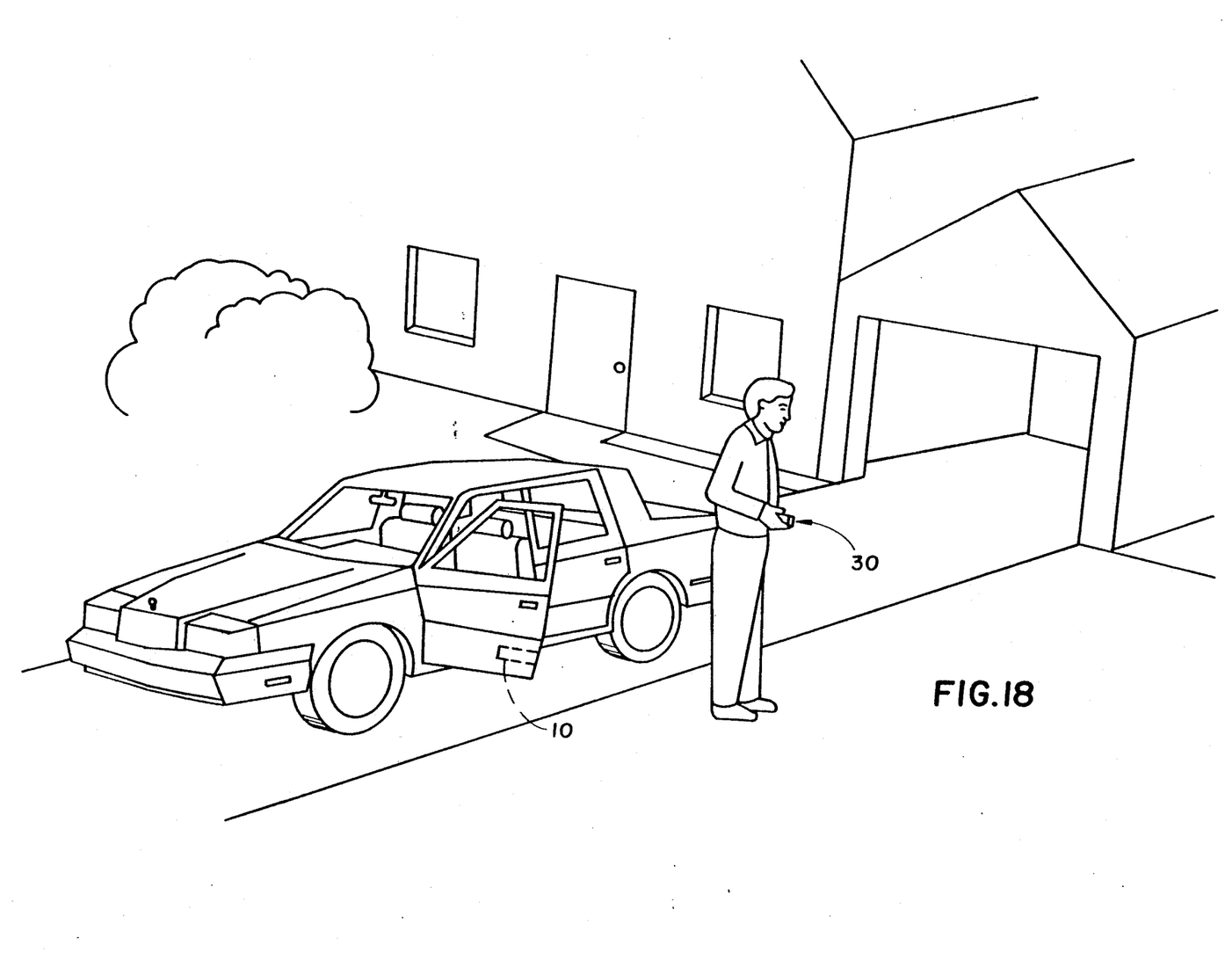
FIG. 18 is a perspective view illustrating the use of the present invention.

FIG. 18 is a perspective view of the present invention as it is typically used.

What is claimed is:

1. A combination flashlight and courtesy light unit for a vehicle, comprising:
    power supply means for providing an electric current;
    a compartment within a wall of a vehicle;
    a first plurality of electrical contacts disposed within said compartment and connected to said power supply means;
    a light unit adapted for insertion within said compartment, said light unit further comprising,
    a housing;
    a second plurality of electrical contacts on said housing for providing a conductive coupling with said first plurality of contacts when said light unit is inserted in said compartment,
    a rechargeable battery connected to said second plurality of contacts for receiving said electrical current and storing a charge when said light unit is inserted in said compartment,
    a switch mounted on said housing,
    a light source connected to said battery and a second plurality of contacts through said switch, said light source being selectively energized by said switch;
    whereby said battery energizes said light source using the stored charge when said switch is closed and said light unit is not inserted in said compartment, and said power supply means energizes said light source when said switch is closed and said light is inserted in said compartment.

2. The combination courtesy light and flashlight assembly according to claim 1, wherein said power supply is connected to a 12 V vehicle electrical system for providing less than 12 V regulated DC power to said battery.

3. The combination courtesy light and flashlight assembly according to claim 1, wherein said power supply is connected to a 12 V vehicle electrical system for providing 3.3 V or less regulated DC power to said battery.

4. The combination courtesy light and flashlight assembly according to claim 3, wherein said power supply further comprises a 12 V unregulated DC input, a ground input, a resistor connected to said 12 V input, a first diode having a cathode connected to said resistor and an anode connected to said ground input, a second diode having an anode connected to the cathode of said first diode and having a cathode, and a current amplifier connected between the cathode of said second diode and said ground input.

5. The combination courtesy light and flashlight assembly according to claim 4, wherein said current amplifier further comprises an operational amplifier and three resistors.

6. A combination courtesy light and flashlight assembly for a vehicle, comprising:
    power supply means for providing an electric current;
    a compartment within a wall of a vehicle;
    first electrical contact means disposed within said compartment and connected to said power supply means for providing a conductive path thereto;
    a light unit adapted for insertion within said compartment, said light unit further comprising,
    a housing,
    a second plurality of electrical contacts disposed on said housing for providing a conductive coupling with said first contact means when said light unit is inserted in said compartment,
    a rechargeable battery connected to said second plurality of contacts for receiving said electrical current and storing a charge when said light unit is inserted in said compartment,
    a switch mounted on said housing,
    a light source connected to said battery through said switch, said light source being selectively energized by said switch;
    whereby said battery energizes said light source with said stored charge when said switch is closed and said light unit is not inserted in said compartment, and said power supply means energizes said light source when said switch is closed and said light unit is inserted in said compartment.

7. The combination courtesy light and flashlight assembly according to claim 6, further comprising a prism arranged adjacent to said light unit for directing light in a predetermined direction.

8. The combination courtesy light and flashlight assembly according to claim 6, wherein said first contact means further comprises a first plurality of electrical contacts and a corresponding number of springs, said first plurality of contacts being mounted within said compartment on said springs for providing an opposing force when said light unit is inserted into said compartment.

9. The combination courtesy light and flashlight assembly according to claim 8, wherein said first plurality of electrical contacts comprises three electrical contacts.

10. A combination courtesy light and flashlight assembly for a vehicle, comprising:
    power supply means for providing an electric current,
    a compartment within a wall of a vehicle;
    first electrical contact means including a first plurality of electrical contacts connected to said power supply means for providing a conductive coupling therewith, and a corresponding number of springs, each one of said first plurality of contacts being mounted within said compartment on a corresponding one of said springs;
    a light unit adapted for insertion within said compartment, said first contact means providing an opposing force to said light unit when inserted in said compartment, and said light unit further comprising, a housing, locking means disposed on said housing for retaining the light unit within said compartment against the opposing force of said first contact means, a second plurality of electrical contacts disposed on said housing for providing a conductive coupling with said first contact means when said light unit is locked within said compartment, a rechargeable battery connected to said second plurality of contacts for receiving said electrical current and storing a charge when said light unit is inserted in said compartment, a switch mounted on said housing, a light source connected to said battery through said switch, said light source being selectively energized by said switch;

whereby said battery energizes said light source using the stored charge when said switch is closed and said light unit is not inserted in said compartment, and said power supply means energizes said light source when said switch is closed and said light unit is inserted in said compartment.

11. The combination courtesy light and flashlight assembly according to claim 10, wherein said locking means comprises a detent latch, said detent latch defined by a flexible finger having a protruding retainer for engaging a rim of said compartment when said light unit is inserted in said compartment, and a protruding catch for allowing manual depression of said flexible finger for removal of said light unit.

12. The combination courtesy light and flashlight assembly according to claim 10, wherein said locking means comprises a rib disposed around the periphery of said housing, and said compartment is defined by an internal peripheral groove for receiving said rib.

13. The combination courtesy light and flashlight assembly according to claim 12, wherein said compartment is mounted within the roof of a vehicle for providing a detachable overhead light.

14. The combination courtesy light and flashlight assembly according to claim 13, wherein said light unit further comprises a lens covering said light source for directing light generated thereby.

15. The combination courtesy light and flashlight assembly according to claim 14, wherein said lens is a dual color lens.

16. A combination flashlight and courtesy light unit for a vehicle, comprising:

power supply means connected to a 12 V electrical system of said vehicle for providing at most 3.3 V regulated DC power therefrom;

a compartment within a wall of a vehicle;

a first plurality of electrical contacts disposed within said compartment and connected to said power supply means;

a light unit adapted for insertion within said compartment, said light unit further comprising, a housing, a second plurality of electrical contacts disposed exteriorly on said housing for providing a conductive coupling with said first plurality of contacts when said light unit is inserted in said compartment, a rechargeable battery connected to said second plurality of contacts for receiving electrical current from said electrical system and storing a charge when said light unit is inserted in said compartment, a switch mounted on said housing, a light source connected to said battery and a second plurality of contacts through said switch, said light source being selectively energized by said switch;

whereby said battery energizes said light source using the stored charge when said switch is closed and said light unit is not inserted in said compartment, and said power supply means energizes said light source when said switch is closed and said light unit is inserted in said compartment.

17. The combination courtesy light and flashlight assembly according to claim 16, wherein said power supply means further comprises a 12 V unregulated DC input, a ground input, a resistor connected to said 12 V input, a first diode having a cathode connected to said resistor and an anode connected to said ground input, a second diode having an anode connected to the cathode of said first diode and having a cathode, and a current amplifier connected between the cathode of said second diode and said ground input.

18. The combination courtesy light and flashlight assembly according to claim 17, wherein said current amplifier further comprises an operational amplifier and three resistors.

* * * * *